United States Patent [19]

Swathirajan et al.

[11] Patent Number: 5,272,017
[45] Date of Patent: Dec. 21, 1993

[54] MEMBRANE-ELECTRODE ASSEMBLIES FOR ELECTROCHEMICAL CELLS

[75] Inventors: Sundararajan Swathirajan, Troy; Youssef M. Mikhail, Sterling Heights, both of Mich.

[73] Assignee: General Motors Corporation, Detroit, Mich.

[21] Appl. No.: 862,691

[22] Filed: Apr. 3, 1992

[51] Int. Cl.$^5$ .................. H01M 8/10; H01M 4/96; H01M 4/92; H01M 6/18

[52] U.S. Cl. ........................... 429/33; 429/41; 429/42; 429/192

[58] Field of Search ................. 429/41, 43, 30, 33, 429/192

[56] References Cited

U.S. PATENT DOCUMENTS

| | | |
|---|---|---|
| 3,134,697 | 5/1964 | Niedrach et al. . |
| 4,272,353 | 6/1981 | Lawrance et al. . |
| 4,804,592 | 2/1989 | Vanderborgh et al. ............ 429/33 |
| 4,826,554 | 5/1989 | McIntyre et al. . |
| 4,876,115 | 10/1989 | Raistrick ............... 427/115 |

OTHER PUBLICATIONS

Partial European Search Report No. EP 93 20 0685 corres to U.S. Ser. No. 07/862,691 dated Jul. 13, 1993 and Annex.
K. Prater, J. Power Sources, 29 239 (1990).
G. A. Eisman, J. Power Sources, 29, 389 (1990).
E. A. Ticianelli et al, J. Electrochem. Soc., 135, 2209 (1988).
E. A. Ticianelli et al, J. Electroanal. Chem. 251, 275 (1988).
S. Srinivasan et al, J. Power Sources, 22, 359 (1988).
S. Srinivasan et al, J. Power Sources, 29, 367 (1990).
"Proceedings of the 26th Intersociety Energy Conversion Engineering Conference", Los Alamos, vol. 3, Aug. 4–9, 1991.
Mahlon S. Wilson et al, J. Electrochem Soc. vol. 139, No. 2 (1992).
M. S. Wilson et al, J. Applied Electrochem, vol. 22, (1992).

*Primary Examiner*—John S. Maples
*Attorney, Agent, or Firm*—Lawrence B. Plant

[57] ABSTRACT

A combination, unitary, membrane and electrode assembly with a solid polymer electrolyte membrane, and first and second electrodes at least partially embedded in opposed surfaces of the membrane. The electrodes each comprise a respective group of finely divided carbon particles, very finely divided catalytic particles supported on internal and external surfaces of the carbon particles and a proton conductive material intermingled with the catalytic and carbon particles. A first group of finely divided carbon particles forming the first electrode has greater water attraction and retention properties, and is more hydrophilic than a second group of carbon particles forming the second electrode. In a preferred method, the membrane electrode assembly of the invention is prepared by forming a slurry of proton conductive material and at least one group of the carbon and catalyst particles. The slurry is applied to the opposed surfaces of the membrane and heated while being pressed to the membrane for a time and at a temperature and compressive load sufficient to embed at least a portion of the particles into the membrane.

13 Claims, 4 Drawing Sheets

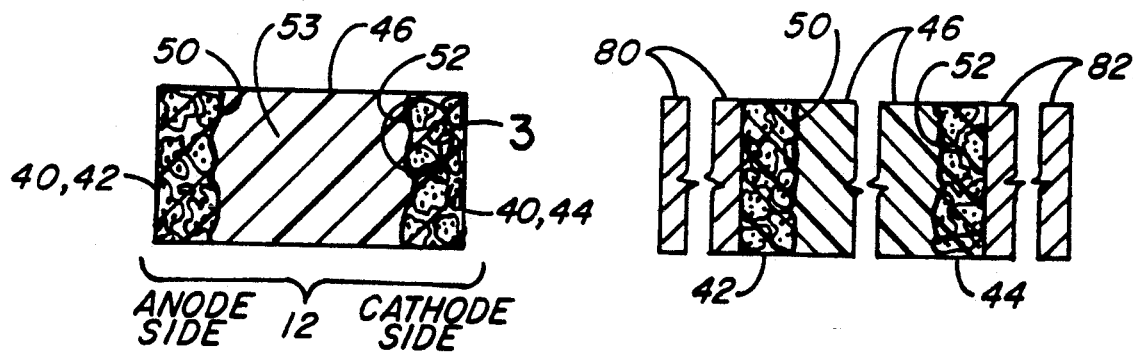
Fig. 2
Fig. 2A
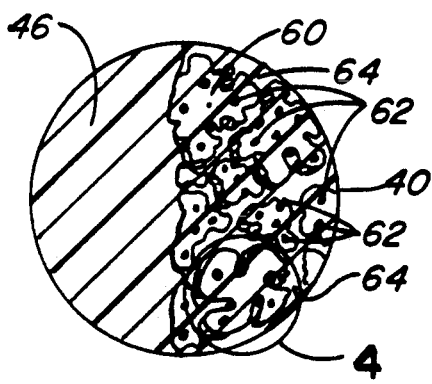
Fig. 3
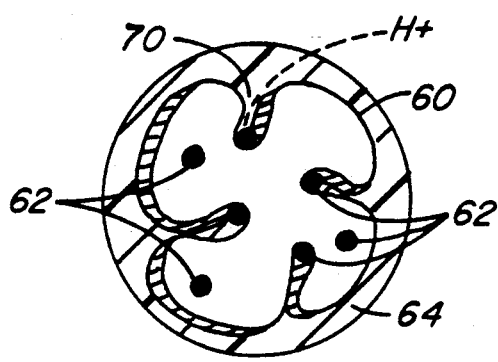
Fig. 4
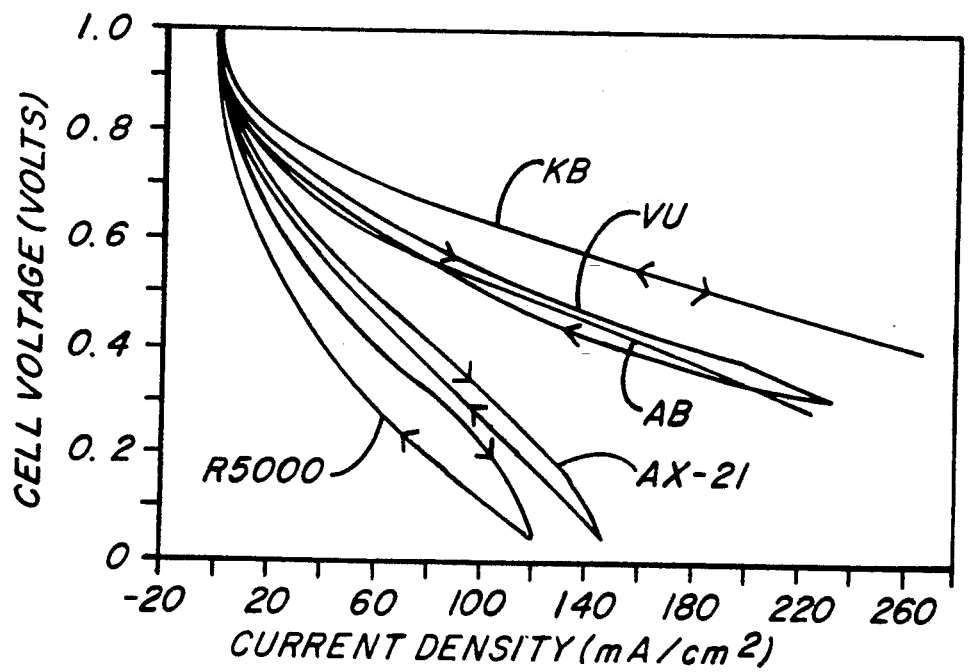
Fig. 5

MEMBRANE-ELECTRODE ASSEMBLIES FOR ELECTROCHEMICAL CELLS

FIELD OF THE INVENTION

This invention relates to membrane and electrode assemblies for use with electrochemical cells having solid polymer electrolyte membranes.

BACKGROUND OF THE INVENTION

Electrochemical cells are desirable for various applications when operated as fuel cells. During operation, fuel cells typically consume hydrogen and oxygen or air to provide electrical power. Although such cells are used in space applications, they have not been favored for transportation use. The cost of power produced by a fuel cell is several orders of magnitude greater than the cost of other power generation alternatives, partly because of the poor utilization of precious metal catalysts in conventional electrodes. However, power produced from hydrogen is desirable because hydrogen is environmentally acceptable and hydrogen fuel cells are efficient. Important features of a fuel cell include reaction surfaces, catalysts, ion conductive media, and mass transport media. Such features are typically included in membrane and electrode assemblies of a fuel cell. Therefore, it is desirable to improve the catalyst utilization in such assemblies to render fuel cells more attractive for transportation use.

SUMMARY OF THE INVENTION

There is provided a combination, unitary, membrane electrolyte and electrode assembly with a solid polymer electrolyte membrane having first and second opposed surfaces and a thickness (intermediate region) therebetween. First and second electrodes are each adhered to a respective one of the first and second membrane surfaces. Each of the electrodes is well adhered to the membrane and preferably at least partially embedded in the membrane.

The electrodes each comprise a respective group of finely divided carbon particles, very finely divided catalytic particles supported on internal and external surfaces of the carbon particles and a proton conductive material intermingled with the catalytic and carbon particles.

A first group of finely divided carbon particles forming the first electrode has greater water attraction and water retention properties and is relatively more hydrophilic and less hydrophobic than a second group of carbon particles forming the second electrode.

Preferably, each one of the first and second groups of the finely divided carbon particles is characterized by a pH, the first group has a pH in the range of about 6 to about 7, and the second group a pH of about 8 to about 10. Thus, the first group is relatively more acidic and correspondingly less basic than the second group.

The carbon particles define pores some of which are internal pores in the form of holes in the carbon particles; other pores are gaps between adjacent carbon particles.

Preferably, the first group of carbon particles has an average pore size (radius) in the range of about 90 to about 110 angstroms and the average pore size of the second group is in the range of about 60 to 80 angstroms. Conveniently, the average pore size of the first group is achieved by ball-milling which produces a suitable distribution of pore sizes and relatively random distribution of equivalent particle spherical diameters.

The preferred membrane electrolyte material and ion (proton) conductive material are each perfluorocarbon sulfonic acid polymer. Optionally, the ion conductive material also includes polytetrafluoroethylene.

In another embodiment, the first and second electrodes further comprise respective first and second Teflonated (polytetrafluoroethylene coated, impregnated) graphite sheets, adhered to a respective surface of the membrane. The first group of particles is disposed between the first surface of the membrane and the first sheet; the second group is disposed between the second surface and the second sheet.

In a preferred method, the membrane electrode assembly of the invention is prepared by first forming a slurry of proton conductive material and at least one group of finely divided carbon particles and very finely divided catalytic particles supported on and in the carbon particles. Next, the slurry is applied to first and second surfaces of the membrane.

Then the applied slurry is heated while being pressed to the membrane for a time and at a temperature and compressive load sufficient to soften the membrane and at least partially embed at least a portion of the particles in the membrane to thereby form the first and second electrodes. The embedded or inset particles are at least partially set in surfaces of the membrane although they may not be totally encompassed by the membrane or disposed below its surface.

In another embodiment, the slurry is applied to respective first and second Teflonated graphite sheets. Then, the wetted side of the first sheet is applied to the first surface of the membrane and the wetted side of the second sheet is applied to the second surface of the membrane. The applied sheets are hot-pressed to the membrane while being heated for a time and at a temperature and compressive load sufficient to soften the membrane and at least partially embed at least a portion of the particles in the membrane to thereby form the first and second electrodes.

Desirably, before use, and if needed the method further includes treatment to remove any organic and inorganic impurities and to convert any non-hydrogen cation exchange sites of the proton conductive material to the hydrogen form.

Desirably, before the step of heating while pressing, the applied slurry is dried by heating for a time and at a temperature sufficient to vaporize any volatile liquid components of the slurry Preferably, the step of heating while pressing is conducted at about 1,000 to about 2,000 pounds per square inch ($lb/in^2$) compressive load for about 1 to about 5 minutes at a temperature of about 120° C. to about 150° C. The compressive load may vary with time. That is, less load and longer times may be used, and the converse also applies Preferably, the proton conductive material and the catalytic and carbon particles forming each electrode are in a proportion based on 100 parts, of 30 to about 50 parts proton conductive material and the balance being catalytic and carbon particles. And, the platinum and carbon particles are in a proportion based on 100 parts by weight of up to about 15 parts platinum and the balance being carbon particles.

The embedding of electrodes into the membrane under pressure, provides for a continuous path of proton conductive material from one side of the membrane electrode assembly to the other. The intimate intermingling of proton conductive material with catalyst and carbon particles provides a continuous path for protons to the catalyst site where reaction occurs. The method also achieves a relative peak distribution of catalytic particles adjacent the membrane at each electrode.

The membrane electrode assembly of the invention advantageously produces required power output at a very low catalyst loading of less than about 0.07 milligrams per cm² of electrode surface area. Further, good results are possible with the Pt loading of one electrode being less than that of the other, so that the total cell catalyst loading may be less than about 0.13 milligrams of the platinum particles per cm² of the surface area of either one of the electrodes.

Thus, the new membrane electrode assembly of the invention provides relatively high power output with unexpectedly low catalyst loading.

These and other objects, features and advantages will become apparent from the following description of the preferred embodiments, appended claims and accompanying drawings.

BRIEF DESCRIPTION OF THE DRAWINGS

FIG. 2 is a pictorial illustration of a cross-section of a membrane electrode assembly according to the invention.

FIG. 2(a) is a pictorial illustration of a membrane as in FIG. 2 and having graphite sheets.

FIG. 3 is a pictorial illustration showing a magnified view of a portion of FIG. 2.

FIG. 4 is a pictorial illustration showing a magnified view of a portion of FIG. 3.

FIG. 5 is a graph of hydrogen-oxygen fuel cell performance utilizing various carbon particles as cathode electrode substrates.

DETAILED DESCRIPTION OF THE PREFERRED EMBODIMENTS

Figure 1:
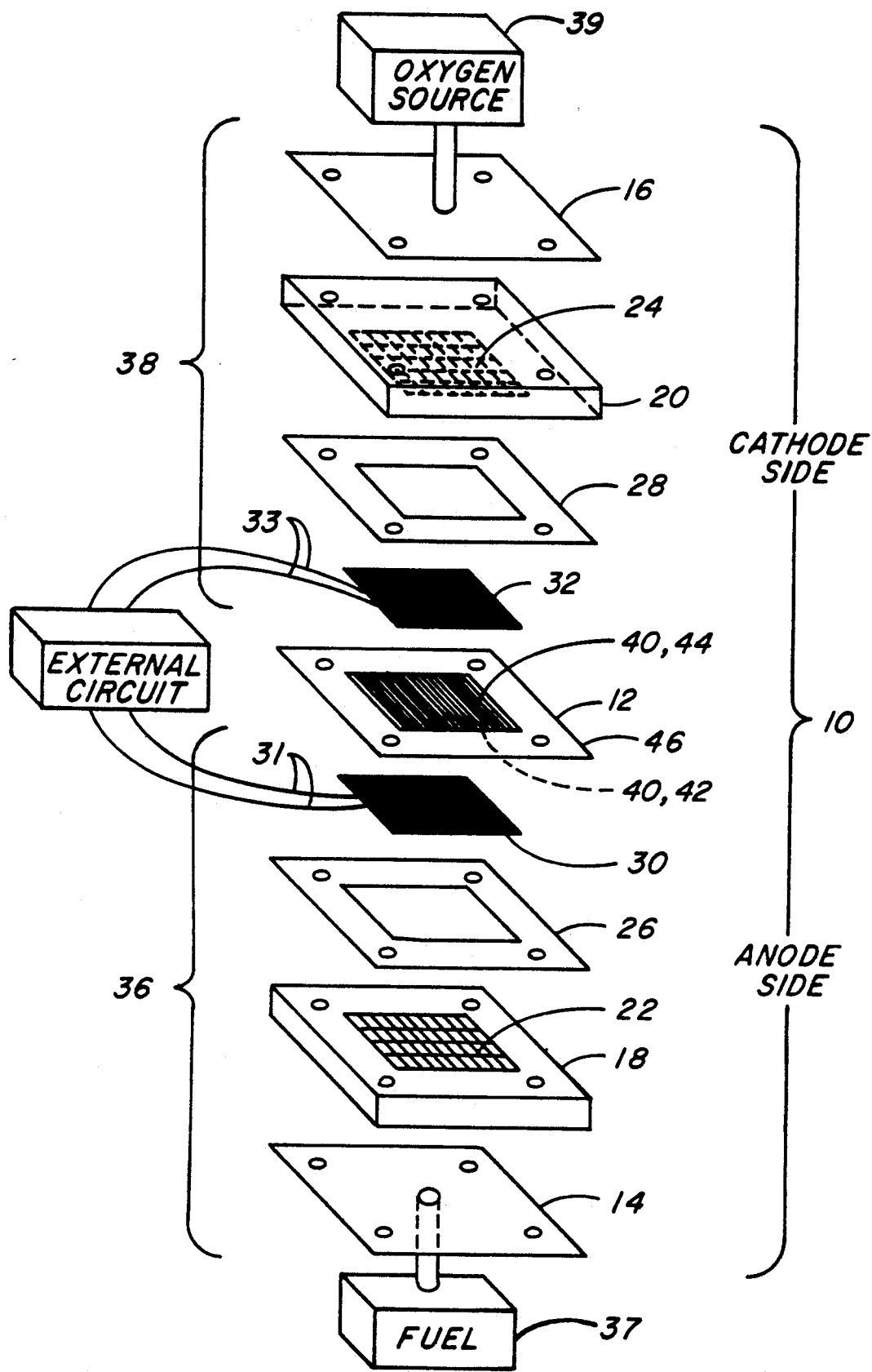
FIG. 1 is a schematic view of an unassembled electrochemical fuel cell having a membrane electrode assembly according to the invention.

Referring to FIG. 1, an electrochemical cell 10 with a combination membrane electrolyte and electrode assembly (MEA) 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14,16, graphite blocks 18,20 with openings 22,24 to facilitate gas distribution, gaskets 26,28, carbon cloth current collectors 30,32 with respective connections 31,33 and the membrane electrolyte and electrode assembly (MEA) 12. The two sets of graphite blocks, gaskets, and current collectors, namely 18, 26, 30 and 20, 28, 32 are each referred to as respective gas and current transport means 36,38. Anode connection 31 and cathode connection 33 are used to interconnect with an external circuit which may include other fuel cells.

Electrochemical fuel cell 10 includes gaseous reactants, one of which is a fuel supplied from fuel source 37, and another is an oxidizer supplied from source 39. The gases from sources 37,39 diffuse through respective gas and current transport means 36 and 38 to opposite sides of the MEA 12.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10.

SPE Membrane

The solid polymer electrolyte (SPE) membrane 46, of the present invention is well known in the art as an ion conductive material. Typical SPE membranes are described in U.S. Pat. Nos. 4,272,353 and 3,134,697, and in Journal of Power Sources, Volume 29 (1990), pages 367-387.

The SPE membranes or sheets are ion exchange resin membranes. The resins include ionic groups in their polymeric structure; one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation ion exchange groups are hydrated sulfonic acid radicals which are attached to the polymer backbone by sulfonation.

The formation of these ion exchange resins into membranes or sheets is also well known in the art. The preferred type is perfluorinated sulfonic acid polymer electrolyte in which the entire membrane structure has ion exchange characteristics. These membranes are commercially available, and a typical example of a commercial sulfonated perfluorocarbon, proton conductive membrane is sold by E.I. Dupont de Nemours & Co. under the trade designation NAFION. Another is sold by Dow Chemical. Such proton conductive membranes may be characterized by monomers of the structures:

$$CF_2=CFOCF_2CF_2SO_3H \text{ and}$$

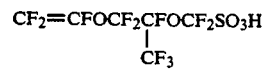

$$CF_2=CFOCF_2CFOCF_2SO_3H$$
$$|$$
$$CF_3$$

In the electrochemical fuel cell 10 of the invention, the membrane 46 is a cation permeable, proton conductive membrane, having H+ ions as the mobile ion; the fuel gas is hydrogen and the oxidant is oxygen or air. The overall cell reaction is the oxidation of hydrogen to water and the respective reactions at the anode 42 and cathode 44 are as follows:

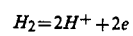

$$H_2 = 2H^+ + 2e$$

$\frac{1}{2} O_2 + 2H^+ + 2e = H_2O$

Since hydrogen is used as the fuel gas, the product of the overall cell reaction is water. Typically, the product water is rejected at the cathode 44 which is the electrode 40 on the oxygen side. Typically, water then escapes by simple flow or by evaporation. However, means may be provided if desired, for collecting the water as it is formed and carrying it away from the cell.

Water management in the cell is important and key to the successful long-term operation of electrochemical fuel cell 10. Spatial variations of water content within the polymeric electrolyte membrane 46 of a current-carrying fuel cell 10 result from the electroosmotic dragging of water with proton (H+) transport from anode to cathode, the production of water by the oxygen reduction reaction at the cathode, humidification conditions of the inlet gas stream, and "back-diffusion" of water from cathode to anode.

The invention provides catalyst substrates comprising carbon, and catalyst distribution and loadings tailored to the requirements of the hydrogen oxidation and oxygen reduction reactions occurring in the fuel cell 10. In addition, more effective proton transfer is provided by embedding electrodes 40 into the membrane 46. Accordingly, the MEA 12 of cell 10 has membrane 46 with spaced apart first and second opposed surfaces 50,52, a thickness or an intermediate membrane region 53 between surfaces 50,52. Respective electrodes 40, namely anode 42 and cathode 44 are well adhered to membrane 46, at a corresponding one of the surfaces 50,52. The catalyzed carbon particles 60 are adhered to the membrane 46 and at least a portion of the particles 60 are at least partially embedded in membrane 46.

The embedded or inset particles are at least partially set in surfaces of the membrane although they may not be totally encompassed by the membrane or disposed below its surface.

As shown in FIG. 3, each of the electrodes 40 are formed of a corresponding group of finely divided carbon particles 60 and very finely divided catalytic particles 62 and a proton conductive material 64 intermingled with the particles.

It should be noted that the carbon particles 60 forming the anode 42 differ from the carbon particles 60 forming the cathode 44 as characterized by physical properties of such particles described below. The first group of finely divided carbon particles 60 forming the anode 42 has greater water attraction and retention properties, and is relatively more hydrophilic and less hydrophobic than the second group forming the cathode 44. In addition, the catalyst loading at the anode 42 is preferably less than the catalyst loading at the cathode 44.

Although the characteristics of the carbon particles and the catalyst loading differ for anode 42 and cathode 44, the basic structure of the two electrodes 40 is otherwise generally similar, as shown in the enlarged portions of FIGS. 3 and 4, each taken from FIG. 2.

Referring now to FIG. 4, a further magnified view of a portion of a porous gas diffusion electrode 40 in accordance with the present invention is presented. Carbon particles 60 are provided to support catalyst particles 62, preferably of platinum (Pt), which are preferably supported on internal and external surfaces of the carbon particles 60. Carbon particles 60 define pores 70 some of which are internal pores 70 in the form of holes in the carbon particles; other pores 70 are gaps between adjacent carbon particles. The pores 70 enable gases to penetrate within the electrode 40 and in and around carbon particles 60 and pores 70 for electrochemical reactions to occur adjacent catalyst 62.

In order to provide a continuous path to conduct H+ ions to the catalyst 62 for reaction, the proton (cation) conductive material 64 is dispersed throughout each of the electrodes 40, is intermingled with the carbon and catalytic particles 60,62 and is disposed in a plurality of the pores 70 defined by the catalytic particles. Accordingly, in FIG. 4, it can be seen that the proton conductive material 64 encompasses carbon and catalytic particles 60,62.

The characteristics of the carbon particles 60 are of key importance to optimize reactions of the cell and satisfy the differing requirements of the anode 42 and cathode 44. Preferably, the first group of particles 60 at the anode 42 is more acidic and correspondingly less basic than the second group at the cathode and the first group (anode electrode) has a pH less than that of the second group (cathode electrode). (Refer to Tables I and II and FIGS. 5-7).

As mentioned earlier, the carbon particles define pores some of which are internal pores in the form of holes in the carbon particles; other pores are gaps between adjacent carbon particles. Internal pores are also referred to as micropores which generally have an equivalent radius (size) less than about 2 nanometers (nm) or 20 angstroms. External pores are also referred to as mesopores which generally have an equivalent radius (size) of over about 2 nanometers and up to about 20 nanometers or 200 angstroms. The total surface area present in a mass of carbon particles is referred to as BET surface area, expressed in $m^2/gm$. BET surface area accounts for both mesopores and micropores present in the mass. As used herein, the terms "pore" and "pores" refers to both mesopores and micropores and also refers to both internal and external pores unless otherwise indicated.

The carbon particles are sometimes referred to as grains or aggregates.

Preferably, the carbon particles 60 of the first and second groups each have pores with an average size in the range of between about 50 to about 200 angstroms, and at least about 40% of the pores having a size greater than about 20 angstroms. Preferably, the first and second groups of carbon particles 60 each has a BET surface area less than about 1,000 square meters per gram.

Preferably, the first group of carbon particles 60 forming the anode has a pH in the range of about 6 to about 7 and an average pore size in the range of about 90 to about 110 angstroms. Preferably, the first group consists of carbon particles obtained from Cabot Corp. and sold under the name of "Vulcan XC-72R". The Vulcan XC-72R carbon particles are ball-milled to enhance their properties for anode use.

Preferably, the second group of carbon particles 60 forming the cathode has a pH in the range of about 8 to about 10 and the average pore size of the second group is in the range of about 60 to 80 angstroms. Preferably, the second group consists of carbon particles obtained from Noury Chemical Corp., and sold under the name of "Ketjen black". The Ketjen black particles are used in an as-received condition to form the cathode.

As can readily be seen from the pH values, the first group is relatively more acidic and less basic than the second group. Such pH values are measured in an aqueous suspension of a group of carbon particles.

Desirably, each one of the first and second groups of finely divided carbon particles has an equivalent average spherical diameter less than about 35 nm, and in a range of about 25 to about 35 nm.

Optionally, respective electrodes 40 (anode 42, cathode 44), further comprise respective first and second Teflonated (polytetrafluoroethylene coated, impregnated) graphite sheets 80,82, adhered to a respective surface of membrane 46. The first group of catalyzed particles 60 is disposed between the first surface 50 of membrane 46 and the first sheet 80; the second group of catalyzed particles 60 is disposed between the second surface 52 and the second sheet 82. Each Teflonated sheet 80,82 is about 7½ to 13 mils thick.

Preparation of Electrolyte and Electrode Assemblies

In order to achieve localization of the platinum (Pt) catalyst 62 near the membrane-electrode boundary 50,52 and adjacent the membrane 46, to achieve optimal proton transport, the MEA 12 was prepared by applying a slurry of catalyzed carbon particles 60,62 and proton conductive material 64 onto the membrane 46. The applied slurry was then hot-pressed to at least partially embed the particles 60,62 and proton conductive material 64 in the membrane 46. The embedded or inset particles are at least partially set in surfaces of the membrane although they may not be totally encompassed by the membrane or disposed below its surface.

It should be noted that the hot-pressed slurry forms electrodes 40 essentially integral with the membrane 46. Although the catalyzed carbon particles 60 may not totally penetrate the surfaces 50,52 of the membrane 46, the particles 60 do become embedded in surfaces 50,52 when it softens during hot-pressing. Thus, some carbon particles 60 are at least partially set in the membrane, although perhaps not entirely submerged below surfaces 50,52. Hot-pressing also achieves a peak distribution of catalyst particles 62 adjacent surfaces 50,52 and intermediate region 53 of membrane 46. Due to the thickness of intermediate region 53, contact between electrodes 42,44 is prevented.

The preferred perfluorocarbon sulfonic acid was used as the membrane 46 and proton conductive material 64. Solution Technology supplies such proton conductive material in dissolved form under the designation "NAFION SOLUTION". The slurry optionally contained polytetrafluoroethylene (TEFLON). TEFLON is a trademark of Dupont.

The general method of making a combination membrane electrolyte and electrode assembly (MEA) 12 includes:

a) forming a slurry of proton conductive material and at least one group of finely divided carbon particles 60 and very finely divided catalytic particles 62 supported on and in the carbon particles 60;
b) applying the slurry onto a first surface 50 of the membrane;
c) applying the slurry onto a second surface 52 of the membrane 46; and
d) heating while pressing the applied slurry for a time and at a temperature and compressive load sufficient to embed at least a portion of the particles 60,62 into the membrane 46 to thereby form the first and second electrodes 40.

Optionally, the pressed membrane 46 and electrode 40 are treated to remove any organic and inorganic impurities, and if necessary, to convert any non-hydrogen cation exchange sites of the proton conductive material to the hydrogen form.

Preferably, two groups of carbon particles are used to prepare first and second respective slurries applied to corresponding first and second surfaces of the membrane. The first group is characterized by greater water attraction and water retention properties.

In another embodiment, the slurry is applied to respective first and second Teflonated graphite sheets 80,82. Then, the wetted side of the first sheet 80 is applied to the first surface 50 of the membrane 46 and the wetted side of the second sheet 82 is applied to the second surface 52 of the membrane 46. The applied sheets 80,82 are hot-pressed to the membrane while being heated for a time and at a temperature and compressive load sufficient to soften the membrane 46 and at least partially embed at least a portion of the particles 60 in the membrane to thereby form the first and second electrodes 40,42. The embedded or inset particles 60 are at least partially set in surfaces 50,52 of the membrane 46 although they may not be totally encompassed by the membrane 46 or disposed below its surfaces 50,52.

Preferably, the compressive load is in the range of about 1,000 to about 2,000 pounds per square inch ($lb/in^2$) and the time and temperature are respectively about 1 to about 5 minutes at about 120° C. to about 150° C.

EXAMPLE 1

In this example, a membrane electrode assembly (MEA) 12 was made by hot-pressing, using one group of carbon particles, Vulcan XC-72R in an as-received condition for both the anode and cathode. The properties of Vulcan XC-72R as received from the vendor are as per Table I.

The thin film MEA 12 was prepared from a slurry containing NAFION and catalyzed carbon. The slurry was prepared by mixing catalyzed carbon, a 5% NAFION solution (obtained from Solution Technology) and a Teflon suspension (obtained from Dupont). The slurry was thinned to the required extent using either 30 w/o (weight percent) t-butanol or water. The catalyzed carbon was 10 w/o platinum (Pt) catalyst dispersed on Vulcan XC-72R carbon (C), either supplied by the Prototech Company or prepared using the Prototech process and carbons pre-treated by ball-milling. The NAFION content was varied in the range of 20-50 w/o and the Teflon loading was varied in the range of 0-30 w/o.

The slurry was then coated on both sides of an untreated NAFION 117 membrane of 175 microns thick by brushing. The coating was then dried at 90°-95° C. for 30 minutes to remove the alcohol. Next, the applied slurry was hot-pressed at either 120° C. for 5 minutes or at 150° C. for 1 minute at a compressive load of 1000-2000 $lb/in^2$. This produced a thin film electrode at each of the two opposed, major surfaces of the membrane, and the electrodes were at least partially embedded into the membrane. The thin film MEA was then treated by boiling in 5% hydrogen peroxide ($H_2O_2$) for 30 minutes, followed by boiling in 0.5M sulfuric acid ($H_2SO_4$)) for 30 minutes, and finally rinsed several times in conductivity water. The membrane electrode assembly (MEA) had an overall thickness of about 200-225 microns (about 9 mils), consistent with the thin film construction of the electrodes at least partially embedded in the membrane. The MEA exhibited only minor variation in membrane thickness, demonstrating that good adherence is achieved without drastic decrease in membrane thickness and without large variation in the thickness.

EXAMPLE 2

An MEA 12 was prepared by the method of Example 1, using Vulcan XC-72 as received, to form the anode 42 and cathode 44. No Teflon was used in the slurry and each electrode had a Pt loading of 0.08 mg/cm$^2$ (milligrams platinum per square centimeter of electrode surface area). The MEA was tested by placing it in a graphite electrochemical cell. It produced 112 mA/cm$^2$ at 0.5 V under ambient conditions of about 21° C. to 26° C. and 0 to 4 psig.

EXAMPLE 3

An MEA was prepared by the method of Example 2 except that ball-milled Vulcan XC-72 was used to form the anode 42. (See Table I for the specifications of Vulcan as received and ball-milled). The MEA 12 with ball-milled Vulcan (on the anode or fuel side only) produced 144 mA/cm$^2$ at 0.5 V under ambient conditions, described above.

The MEA 12 of Example 3 showed a 30% improvement compared to the MEA 12 of Example 2. This is due to the effect of ball-milled Vulcan carbon particles 60 as the substrate on the anode 42.

In the method of making the embedded electrodes in accordance with the present invention, it is typically necessary to treat the solid polymer electrolyte membrane to remove organic and/or inorganic impurities using $H_2O_2$ and $H_2SO_4$.

EXAMPLE 4

Figure 8:
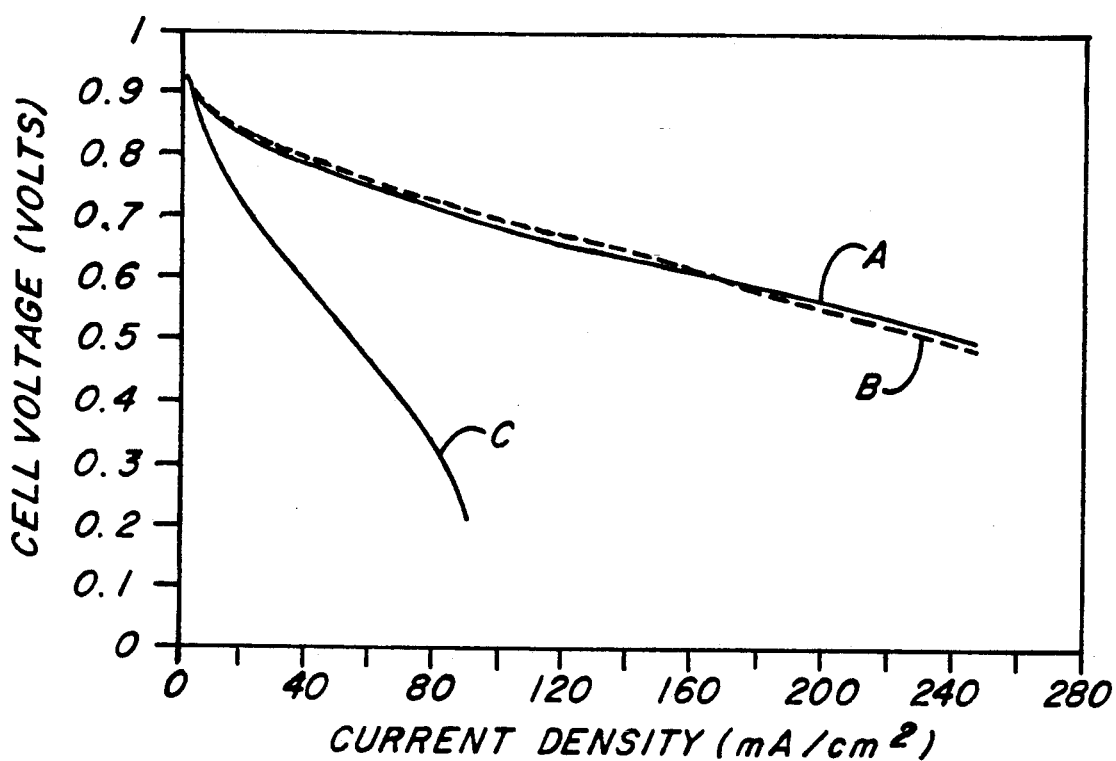
FIGS. 8 and 9 are graphs of hydrogen-oxygen fuel cell performance for membrane electrode assemblies of the invention and for comparative assemblies.

An alternate approach to preparing the thin film electrode assembly involved applying the NAFION based slurry on a Teflonated graphite paper (supplied by Toray Industries, Japan), followed by hot-pressing to a proton exchange membrane (MEA-B). Unlike carbon cloth, the graphite paper did not get soaked in the NAFION solution. The performance of this electrode-membrane assembly was compared in FIG. 8 with that of an assembly prepared by applying the slurry on the membrane as per the earlier examples (MEA-A). For MEA-A and MEA-B, each cathode had 15 w/o Pt dispersed on Ketjen black and the anode had 5 w/o Pt on ball-milled Vulcan XC-72R. The hydrogen-oxygen fuel cell performances for the assemblies (MEA-A and MEA-B) under ambient conditions were almost identical, as shown in FIG. 8.

COMPARATIVE EXAMPLES

Another MEA assembly (MEA-C, FIG. 8) was prepared by applying the slurry onto the membrane and drying the slurry without hot-pressing. When the thin film electrode-membrane assembly was not hot-pressed, the performance of the fuel cell decreased dramatically, as seen in FIG. 8 (MEA-C), due to the high resistance of the assembly. Thus, the hot-pressing procedure is essential for obtaining good fuel cell performance.

For further comparison, membrane electrode assemblies (MEA-X) were prepared using commercially available Prototech electrodes with a Pt loading of 0.5 mg/cm$^2$. These conventional electrodes were then impregnated with a 5% NAFION solution by brushing and drying in a humid atmosphere. The NAFION loading was 1.0 mg/cm$^2$, which is considered optimum for these electrodes. Two electrodes were then placed on either sides of a NAFION 117 membrane and the assembly was hot-pressed at 120° C. for 2 minutes, using a pressure of 2000 lb/in$^2$.

Figure 9:
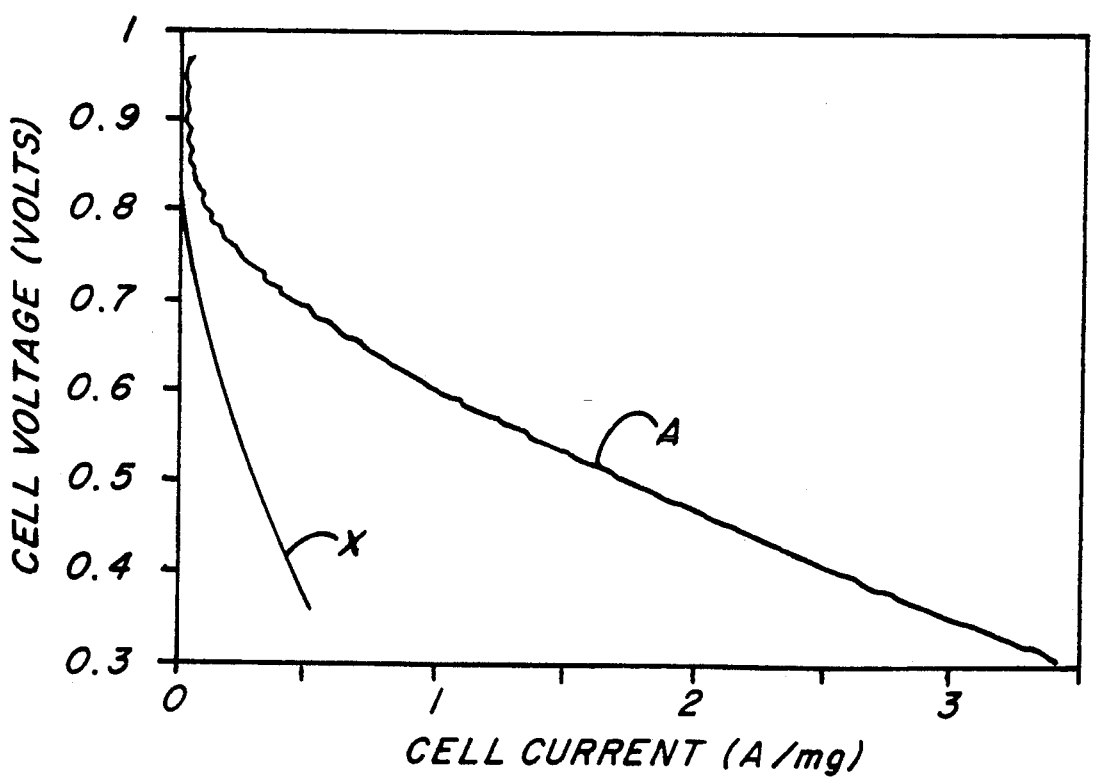

The Prototech based MEA-X was compared to an MEA prepared by the method of Example 1 (MEA-A), as shown in FIG. 9. The catalyst activity, expressed in A/mg, is plotted against cell voltage in FIG. 9 for the two assemblies, MEA-A and MEA-X. Thus, for example, at 0.4 V, the catalyst activity for the thin film assembly (MEA-A), is as high as 2.7 A/mg; whereas it is only 0.4 A/mg for the conventional assembly, thus demonstrating a dramatic increase in the catalyst utilization in the thin film assembly by a factor of nearly 7. These results were based on a voltage scan rate: 5 mV/sec. Cell operated on hydrogen and oxygen at 24° C. with a slight oxygen backpressure of 4 psig. We observed that hot-pressing a carbon cloth electrode causes a dramatic decrease and variation in the membrane thickness. Thickness varied down to as low as 3.5 mils compared to an unpressed thickness of 6.5 to 7 mils. It appeared that the woven fibers of carbon cloth are being pressed to the membrane. In contrast, hot-pressed membranes of Examples 1–4 showed very little variation in thickness as slurry components were pressed in the membrane.

As a further demonstration of the effectiveness of hot-pressing, the adherence of the electrodes of MEA-A (prepared by hot-pressing) was compared to the adherence of electrodes of MEA-C which was prepared without hot-pressing. The adherence of electrodes to each MEA was tested by lightly pressing typical adhesive (scotch-type) tape to an exterior surface of an MEA. That is, tape was applied to an exterior surface of an electrode.

When the tape was removed from an electrode of the hot-pressed MEA of the invention (MEA-A), the tape was virtually clean. This was not surprising given the shiny, smooth surface of the MEA of the invention, (MEA-A). This surface evidences the inextricable combining of NAFION, particles, and membrane which occur during hot-pressing. While not clearly defined, it appears some portions of membrane 46 adjacent the exterior surfaces 50,52 are softened and reformed with the applied slurry as a recast or restructured portion of the membrane and MEA.

This does not occur without hot-pressing, thus the tape removed from the comparative MEA (MEA-C), was covered with a black powder, evidencing easy removal (poor adhesion) of slurry components from the comparative membrane, (MEA-C).

Substrate Characteristics

Examples 2 and 3 show that the carbon substrate (particles) used to disperse the catalyst 62 exerted a profound influence on the retention or rejection of water from the electrode. The ball-milled Vulcan XC-72R carbon particles 60 were beneficial to the hydrogen oxidation reaction. The hydrogen reaction and the water management of the membrane 46 was assisted by the more hydrophilic carbon particles at the fuel electrode (anode 42), whereas the oxygen side (cathode 44) required more hydrophobic carbon particles 60. The ball-milled Vulcan carbon particles 60 are more hydrophilic than the as-received or the heat treated Vulcan carbon particles 60.

The carbon particles 60 carrying catalyst 62 at the anode 42 must be less hydrophobic than the carbon particles 60 at the cathode 44, since water is removed from the anode 42 during fuel cell operation. Thus, carbon particles 60 of two different types prevent the drying of the membrane 46 and simultaneously support a high rate of mass transport of hydrogen to the reaction sites. In the case of ball-milled Vulcan particles, we found that ball-milling for about 2.5 hours reduces the average pore radius from 15.4 nm to 10.5 nm. (Table I). Ball-milling probably breaks down the carbon particle aggregates, thereby enhancing the area of contact of the carbon particles to oxygen. This probably increases the presence of oxygen groups on the surface, thus decreasing the pH of the slurry from 6.8 to 6.2. A lower pH is an indication of a less hydrophobic (more hydrophilic) substrate, which is desirable for promoting the water retention properties of the electrode/membrane interface.

In order to further evaluate the effect of carbon substrate (particle) characteristics on cell performance, additional tests were conducted. In these tests, the carbon particles 60 for the hydrogen electrode (anode 42) were held the same (ball-milled Vulcan XC-72R), and the carbon particles 60 at the cathode 44 were varied to cover a spectrum of surface areas and pore distributions of various carbon particles. Thus, a group of carbon particles designated AX-21 carbon were chosen to represent a high surface area carbon (2900 M$^2$/g) with predominantly micropores (98%), and a group of carbon particles designated Ketjen black carbon (~900 m$^2$/g) was chosen for its high percentage of mesopores (75%). Raven 5000 and Vulcan groups of carbon particles, which have a fair share of both micro and mesopores, were also investigated as carbon substrate selections.

In the tests, the Pt loading was about 0.15 mg/cm$^2$/cell. The ball-milled carbon for the fuel electrode (anode 42) was loaded with 5 w/o Pt prepared by the sodium borohydride reduction method. The various other carbon substrates for the cathode had 15 w/o Pt.

The hydrogen-oxygen fuel cell performance (shown in FIG. 5) under ambient conditions increased in the following order: Raven 5000<AX-21<Vulcan XC-72<Ketjen black. The performance of Ketjen black was 190 mA/cm$^2$@0.5 V, compared to 130 mA/cm$^2$@0.5 V for Vulcan XC-72R. The high performance of Ketjen black and the poor performance of AX-21 may emphasize the important role of the dimensions of the electrode's carbon particle pore dimensions in regulating the rejection of water from the oxygen cathode.

Table I gives some properties of various carbon substrates (carbon particle groups) along with the performance obtained for the hydrogen-oxygen fuel cell. Thus, Ketjen black has only a third of the BET area of AX-21, but the mesopore area (mesopores have diameters in the ranges 3-20 nm and micropores have diameters less than 3 nm) is a factor of ten times higher.

TABLE I

Effect of Carbon Substrate

| Substrate | Total Area (m$^2$/g) | pH | MESOPORE AREA (m$^2$/g) | MESOPORE AREA % | Activity at 0.4 V (mA/cm$^2$) | Pore Radius (Average) (Å) |
|---|---|---|---|---|---|---|
| Ketjen black | 900 | 8.8 | 680 | 75 | 270 | 75 |
| Vulcan XC-72 as received | 231.1 | 6.8 | 108 | 46.9 | 180 | 154.2 |
| Vulcan XC-72R ball-milled 2.5 h | 227.6 | 6.2 | 119 | 52.3 | — | 105.3 |
| Acetylene Black | 64 | 6.6 | 60 | 95 | 170 | 51.0 |
| AX-21 | 2900 | 4.8 | 68 | 2 | 84 | 9.9 |
| Raven 5000 | 481 | 2.3 | 336 | 70 | 68 | 28.9 |

Note:
Activity evaluated using 15 w/o Platinum prepared by the borohydride method Pt loading: 0.15 (±0.02) mg/cm$^2$/cell.
Meso = 3 to 20 nm or 30 to 200 Å. Å designates angstroms.

While not wishing to be held to any particular theory, the following may explain the superior performance of ball-milled Vulcan XC-72R and Ketjen black (as received) when used as the respective groups of carbon particles (substrates) for the hydrogen anode and oxygen cathode, respectively. Pore size determines the water uptake properties of the carbon particles. The smaller the average pore radius, the greater is the tendency of the electrode to become flooded by the water produced by the oxygen reduction reaction. This is apparently due to capillary forces. This flooding will eventually shut off the supply of oxygen to the reaction sites. The mesopore area alone cannot explain the trend in the observed results. For example, Raven 5000 has nearly half the mesopore area of Ketjen black, but the performance is even worse than AX-21. Thus, the chemical properties of the carbon particles have an important role to play in determining the hydrophobicity of the carbon substrate.

Figure 6:
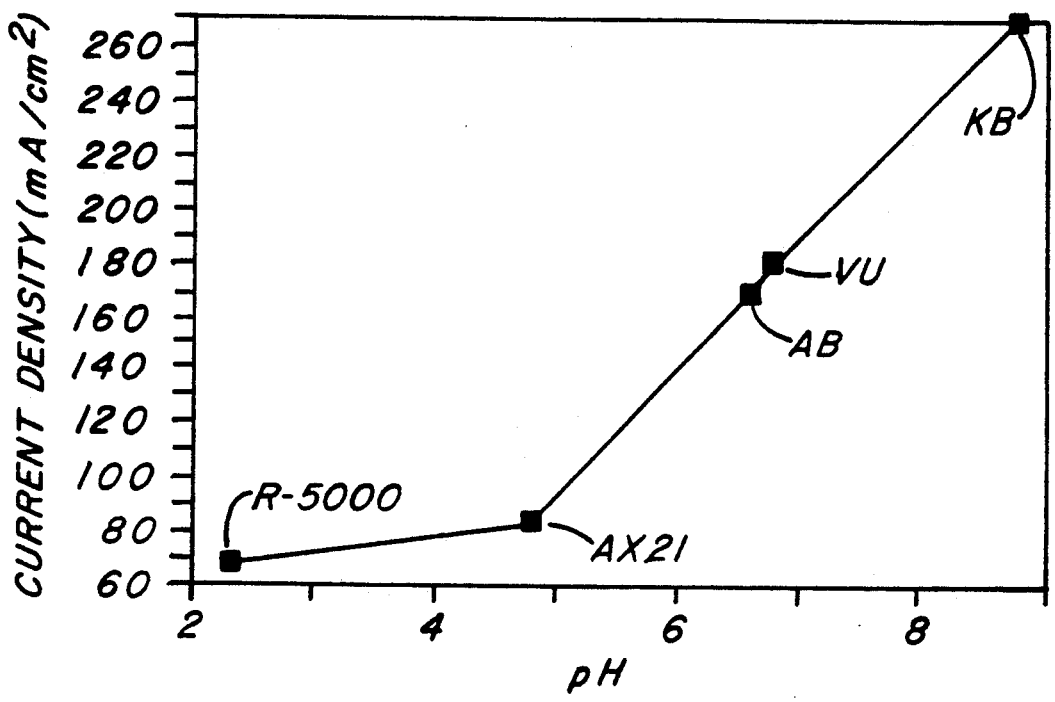
FIG. 6 is a graph of hydrogen-oxygen fuel cell current density versus pH of various carbon particles utilized as cathode electrode substrates.

An important chemical property of carbon particles is the pH of its aqueous carbon slurry. FIG. 6 shows a plot of hydrogen-oxygen fuel cell performance (at ambient conditions and Pt loading of 0.15 mg/cm$^2$/cell) against the pH of the aqueous carbon slurry. The performance is seen to increase with an increase in the pH. The pH values for various carbon particles are given in Table I. Raven 5000, which shows the lowest performance, also shows the lowest pH (at about 2). It appears that the origin of the pH effect lies in the nature of the surface functional groups. The reactions that determine the pH of the aqueous slurry are shown by reference to examples below. Ketjen black>C+2H2O=->C—H3O+ +OH—. Raven 5000>—COOH+H2O- = >—COO— +H3O+.

Acid pH values are caused by the presence of carboxylic (—COOH) groups on the carbon surface. When oxygen groups are strongly bonded to the surface, the substrate becomes very hydrophilic. On the other hand, for carbon particles such as Ketjen black, which is free from oxygen groups and presents a bare carbon surface, the aqueous equilibrium is set up in the alkaline pH range (7-9). A bare carbon surface (or a hydrogenated C surface) is likely to be more hydrophobic.

Figure 7:
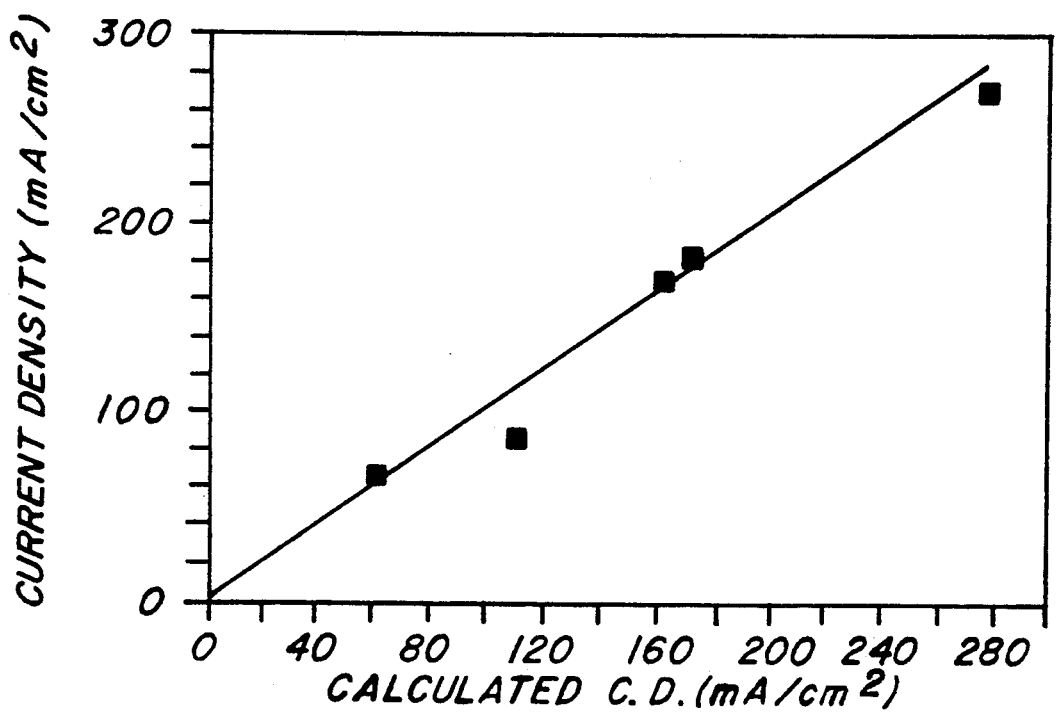
FIG. 7 is a multiple regression plot of current density showing the correlation between current density and pH and mesopore area for various carbon particle substrates.

Having identified the carbon slurry pH and the mesopore area as properties affecting performance, a multiple regression plot of the performance against the two variables is shown in FIG. 7. Actual current density is correlated to calculated current density by the equation:

$i = a + b\, pH + c\, A\, m$

The data agree with the regression line for five different groups of carbon particles possessing a wide spectrum of properties. Apparently, Ketjen black carbon particles provide the optimum carbon substrate for oxygen reduction under ambient conditions, because its hydrophobicity is conditioned by a high surface pH (about 8.8) and a high percentage of mesopores.

Using Vulcan carbon particles 60 at the anode 42 and Ketjen black carbon particles 60 at the cathode 44, we investigated the effect of using different catalyst loadings on the hydrogen and the air (oxygen) sides of the thin film electrode-membrane assembly (MEA) 12. Slurries were prepared as per Example 1 but without Teflon. The electrode thickness was held constant at about 25 microns. The Pt loading was varied by using 5 w/o Pt/C (weight percent platinum to carbon) for the hydrogen side (anode 42) and 10, 15, 20, and 30 w/o Pt/C for the oxygen side (cathode 44). The total Pt loadings and performance at two voltage levels are shown in Table II. It is clear that reducing the Pt loading to 0.03 mg/cm$^2$ (milligrams per square centimeter of electrode surface area) on the hydrogen side (anode 42) still leads to high cell performances as shown in the Table II. The optimum catalyst utilization on the oxygen side (cathode 44) occurs at a Pt loading of 0.06 mg/cm$^2$ using 10 w/o Pt on Ketjen black carbon particles.

The values of cell performance presented in Table II were derived as follows. The 0.095 mg/cm$^2$/cell Pt loading is based upon the use of 1.63 mg Pt per 25 cm$^2$ (0.065 mg/cm$^2$) of cathode electrode area, and 0.75 mg Pt per 25 cm$^2$ (0.03 mg/cm$^2$) of anode electrode area. Thus, loading per cell is (1.63 mg + 0.75 mg)/25 cm or 0.095 mg/cm$^2$/cell. This is based on the fact that the area spanned by each electrode is essentially equivalent and the electrodes are aligned opposite one another on each side of the membrane. Thus, in the expression "mg/cm$^2$ per cell", the numerator is total Pt weight and the denominator is area of either electrode, as described above.

TABLE II

| Pt Loading (mg/cm$^2$/cell) | Pt w/o (Cathode) | CELL PERFORMANCE | | |
|---|---|---|---|---|
| | | mA/cm$^2$ @ 0.6 V | mA/cm$^2$ @ 0.5 V | mA/mg @ 0.6 V |
| 0.095 | 10 | 160 | 238 | 1684 |
| 0.122 | 15 | 190 | 280 | 1557 |
| 0.173 | 20 | 191 | 277 | 1104 |
| 0.233 | 30 | 202 | — | 867 |

Anode Pt loading was held constant at 0.03 mg/cm$^2$ using 5 w/o Pt.
Cathode Pt loading was varied as shown, and ranges from 0.065 mg/cm$^2$ at 10 w/o to 0.203 mg/cm$^2$ at 30 w/o.

In a preferred embodiment ball-milled Vulcan XC-72 and Ketjen black carbon particles provide the best substrates for the hydrogen oxidation (anode 42) and the oxygen reduction (cathode 44) reactions respectively in the fuel cell operating under ambient conditions. Pt loadings as low as 0.03 mg/cm$^2$ for the fuel anode 42 and 0.06 mg/cm$^2$ for the oxygen cathode 44 have been found to be sufficient to yield high performances under ambient conditions (160 mA/cm$^2$ @ 0.6 V and 238 mA/cm$^2$ @ 0.5 V) using the optimum carbon substrates.

The MEA's of the invention have been compared to MEA's formed without hot-pressing. Our hot-pressed MEA is relatively thinner and has embedded electrodes, due to pressing. This reduces ohmic drop and increases performance.

Importantly, the thin film technique affects the dispersion of Pt in the MEA. We observed a peak distribution of Pt near the membrane-electrode boundary, that is, adjacent surfaces 50,52 and intermediate region 53 of membrane 46. The Pt is thus localized to provide maximum catalytic activity. Conventional MEA's, prepared from Prototech electrodes, are not known to provide this beneficial localization of Pt. Other key advantages of the method are: the effective dispersion of the proton conductive material, effective water management by the two groups of carbon particles and low catalyst loadings.

The invention may be practiced using other proton conductive electrolyte membranes, slurry material, and catalyst. The temperature of hot-pressing is mainly dependent on the thermal and mechanical integrity of the electrolyte membrane. Thus, higher or lower temperatures and pressures may be used for hot-pressing.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A combination electrolyte and electrode structure for an electrochemical cell comprising:
   a) a solid proton conductive polymer electrolyte membrane having first and second spaced apart opposed surfaces and an intermediate region;
   b) first and second electrodes each adhered to a respective one of the first and second surfaces of the membrane;
   c) the first and second electrodes respectively comprising first and second groups of carbon particles, each one of the carbon particle groups including a plurality of the carbon particles having internal and external surfaces defining a plethora of pores within and between the carbon particles, very finely divided catalytic particles supported on the internal and the external surfaces of the carbon particles, and a proton conductive material intermingled with the carbon particles and the catalytic particles;
   d) the first group of the carbon particles forming the first electrode being more hydrophilic than the second group of carbon particles forming the second electrode; and
   e) a portion of the carbon particles forming a respective one of the electrodes being at least partially embedded in the membrane.

2. The combination electrolyte and electrode structures according to claim 1, wherein the first and second carbon particle groups are each characterized by a degree of acidity or basicity, and wherein the first group is more acidic than the second group.

3. The combination electrolyte and electrode structure according to claim 1, wherein each one of the first and second carbon particle groups is characterized by a pH, and wherein the first group has a pH less than the pH of the second group.

4. The combination electrolyte and electrode structure according to claim 1, wherein each one of the carbon particle groups has pores with an average size in the range of between about 50 to about 200 angstroms, and at least about 40% of the pores having a size greater than about 20 angstroms.

5. The combination electrolyte and electrode structure according to claim 3, wherein the first carbon particle group has a pH in the range of about 6 to about 7 and the second group has a pH in the range of about 8 to about 10.

6. The combination electrolyte and electrode structure according to claim 4, wherein the first carbon particle group has an average pore size in the range of about 90 to about 110 angstroms and the average pore size of the second group is in the range of about 60 to about 80 angstroms.

7. The combination electrolyte and electrode structure according to claim 1, wherein the catalytic particles of the first and second electrodes are each of platinum, and wherein the platinum loading of the second electrode is less than about 0.07 milligrams per cm$^2$ of electrode surface area, and the platinum loading of the first electrode is less than that of the second electrode.

8. A combination according to claim 1, further comprising first and second sheets of graphite paper impregnated with polytetrafluoroethylene, the first carbon particle group disposed between the first surface of the membrane and the first sheet of said graphite paper and the second carbon particle group disposed between the second surface of the membrane and the second sheet of said graphite paper.

9. The combination electrolyte and electrode structure according to claim 1, wherein the catalytic particles are platinum supported on the carbon particles in a proportion, based on 100 parts by weight, where the platinum particles constitute up to about 15 parts and the carbon particles the balance.

10. The combination electrolyte and electrode structure according to claim 1, wherein the proton conductive material consists essentially of a perfluorocarbon sulfonic acid polymer.

11. The combination electrolyte and electrode structure according to claim 1, wherein the proton conductive material consists essentially of a mixture of perfluorocarbon sulfonic acid polymer and polytetrafluoroethylene.

12. The combination electrolyte and electrode structure according to claim 1, wherein the electrolyte membrane and the proton conductive material each comprise perfluorocarbon sulfonic acid polymer.

13. The combination electrolyte and electrode structure according to claim 1, wherein each one of the electrodes is formed of the proton conductive material and the catalytic and carbon particles in a proportion, based on 100 parts, of about 30 to about 50 parts proton conductive material and the balance the catalytic and carbon particles.

* * * * *

UNITED STATES PATENT AND TRADEMARK OFFICE
CERTIFICATE OF CORRECTION

PATENT NO. : 5,272,017
DATED      : December 21, 1993
INVENTOR(S): Sundararajan Swathirajan et al It is certified that error appears in the above-identified patent and that said Letters Patent is hereby corrected as shown below:

Column 1, line 9 before "Background of the Invention" insert the following new paragraph -- insert --
-- The Government of the United States of America has rights in this invention pursuant to Contract No. DE-AC02-90CH10435 awarded by the U.S. Department of Energy. --

Signed and Sealed this

Seventeenth Day of May, 1994

Attest:

BRUCE LEHMAN

Attesting Officer

Commissioner of Patents and Trademarks